UNITED STATES PATENT OFFICE.

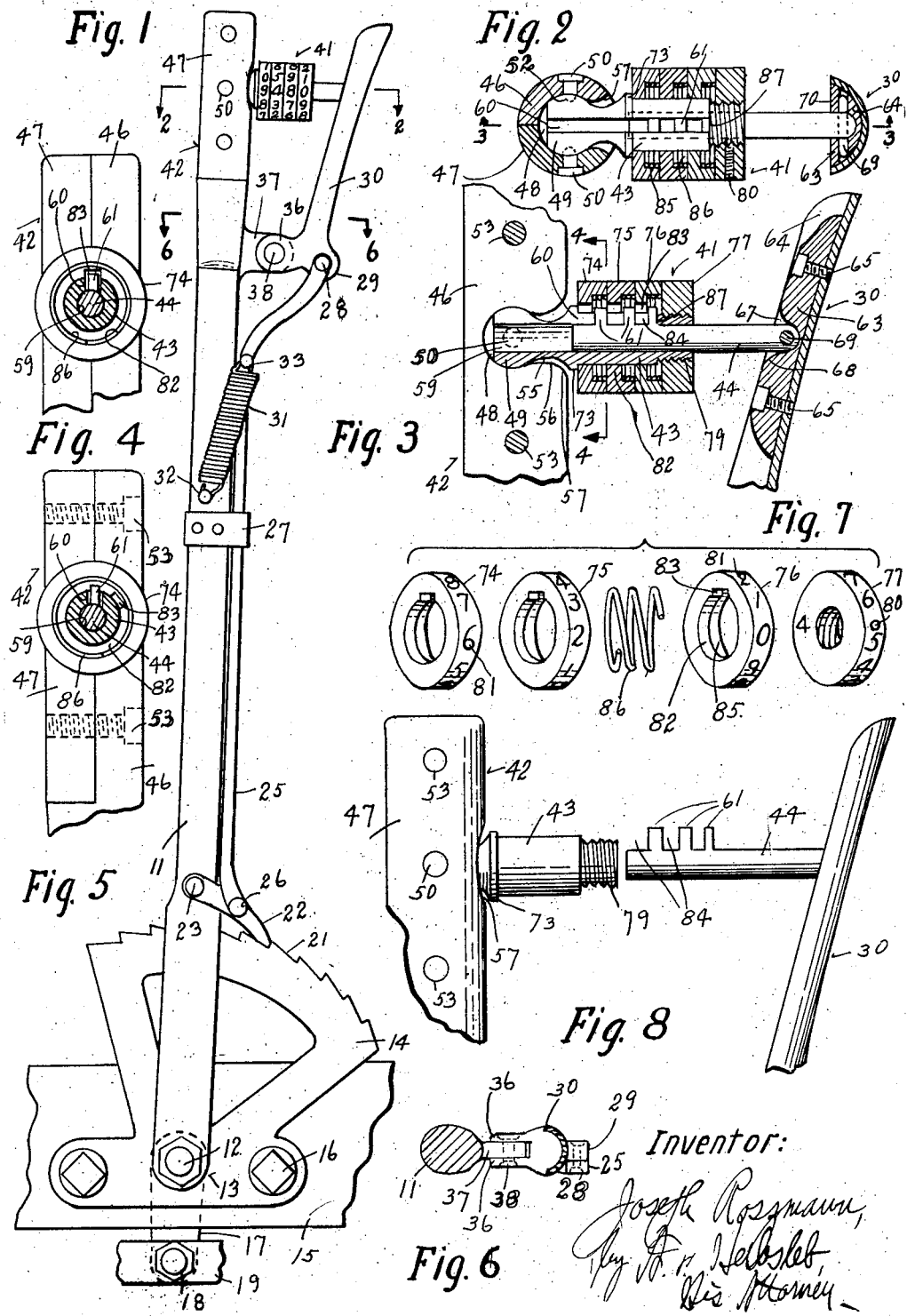

JOSEPH ROSZMANN, OF COVINGTON, KENTUCKY.

SAFETY-LOCK.

1,382,675. Specification of Letters Patent. Patented June 28, 1921.

Application filed July 19, 1920. Serial No. 397,282.

*To all whom it may concern:*

Be it known that I, JOSEPH ROSZMANN, a citizen of the United States, residing at Covington, in the county of Kenton and State of Kentucky, have invented certain new and useful Improvements in Safety-Locks, of which the following is a specification.

My invention relates to safety locks of the character of those adapted for use in locking automobiles, and is applied between the brake-lever and the release-lever of the brake-lever, of the type employed for the emergency brake, for instance, of a Ford automobile.

It is the object of my invention to provide a locking mechanism so arranged that the parts thereof remain in associated relation with each other and with the brake-lever, whether in locked or unlocked relation; further, to provide a permutation lock between the brake-lever and release-lever so arranged that, by manipulation of the tumblers, the release lever may be locked for latching relation of the latch and unlocked for manipulation of the dog of the latching mechanism.

The invention will be further readily understood from the following description and claims, and from the drawings in which latter:

Figure 1 is a side elevation of my improved device shown in its applied relation.

Fig. 2 is an axial section of the same, taken on the line 2—2 of Fig. 1.

Fig. 3 is an axial section of the same, taken in the plane of the line 3—3 of Fig. 2.

Fig. 4 is a cross-section of the same, taken in the plane of the line 4—4 of Fig. 3, showing the parts in unlocked relation.

Fig. 5 is a similar view, showing the parts in locked relation.

Fig. 6 is a detail in horizontal section, taken on the line 6—6 of Fig. 1.

Fig. 7 is a perspective view of the tumblers and a spring between the same, shown in separated relations; and, Fig. 8 is a side elevation of the tube and stem members of the lock in separated relations, and attached respectively to the brake-lever and the release-lever, the balance of the lock being omitted.

The lever 11 is exemplified as the emergency brake-lever of an automobile, suitably fixedly secured to a rock-shaft 12, rockable in a suitable bearing 13 of a segment-rack 14, secured to a suitable part 15 of an automobile, as by bolts 16. An arm 17 is also fixedly secured to the rock-shaft, and has articulating connection 18 with a member 19, which may be of any suitable construction and form an operating connection with the brake of the automobile for manipulating the same.

The segment-rack is provided with ratchet-teeth 21, with which a pawl 22 coacts, the pawl being pivoted by a pin 23 to the brake-lever. A release-rod 25 is articulated by a pin 26 to the pawl, and extends lengthwise of the brake-lever, being slidable lengthwise, for instance, in a bearing 27, secured to the brake-lever. The upper end of the rod is articulated at 28 by a riveted pin with an ear 29 of a release-lever 30. A spring 31, the ends of which are connected to the brake-lever and the release rod at 32 and 33, respectively, normally moves the rod for engaging relation of the pawl with the teeth.

The release-lever is provided with ears 36, encompassing the respective sides of a lug 37, extending from the brake-lever. A riveted pivot-pin 38 is received through pivot-holes in said ears and said lug for pivoting the release-lever to the brake-lever.

A permutation lock, shown generally at 41, is located between the handle 42 of the brake-lever and the release-lever. It is exemplified as comprising a tube-member 43, and a stem-member 44. The tube-member is shown pivoted to the brake-lever and the stem-member is shown pivoted to the release-lever, although the pivoting of these members may be reversed, if desired.

The handle is represented as comprising a body portion 46, which is integral with the brake-lever, and a cap 47, secured to the body. A socket 48 is located between the body and the cap, and the end of the tube-member is shown provided with a ball-structure 49, received in the complementally formed socket for forming a pivot connection between the tube-member and the handle. Pivot-pins 50 may be fixed in the walls of the socket, the inner ends of said pivot-pins being received in pivot-holes 52 in the ball. These pins may be in the form of screws, the heads of which, when the screws have been screwed in place, have the slotted ends of their heads removed, by filing or otherwise, so as to prevent the removal of the screws. The cap may be secured to the body of the handle by means of screws 53, the heads of which also have their slotted ends removed so as to present flush faces at the outside of the body of the handle to prevent the removal of the screws. When the handle is provided with its finish, the ends of the screws are finished with the handle so as to hide the same.

The tube-member is, at the inner end of the ball, provided with a reduced portion 55, forming a neck, which is received in the contracted throat 56, formed by the inner portion of the wall of the socket. The outer end of the throat is widened, as shown at 57, for permitting pivotal movement of the tube-member.

The tube-member is provided with a bore 59, in which the stem 44 is arranged to slide axially. The tube-member is further provided with a slot 60, connecting with the bore at one side of the tube-member, and arranged to accommodate teeth 61 extending from the stem, the teeth moving with the stem.

The stem is pivoted to the release-lever, accomplished by providing the release-lever with a pivot-block 63, let into the concave side 64 of the release-lever, and secured therein for instance by screws 65, connecting the pivot-block with the release lever, the slotted ends of the heads of the screws being removed after the parts are connected and finished with a surface similar to the surface of the pivot-block to hide the existence of the screws. The pivot-block is provided with a recess 67, having diverging walls 68, diverging from the stem, so as to permit pivotal movement between the stem and the pivot-block. A pivot-pin 69 is received through a pin-hole in the end of the stem and pivot-holes in cheeks 70 of the pivot-block at the respective sides of the stem.

The tube-member is, adjacent to its pivot portion, provided with an annular shoulder 73. Tumblers 74, 75, 76 and 77 are received over the tube-member. The end of the tube-member is threaded, as shown at 79. The tumbler 77 is internally threaded for having threaded connection with the threaded end of the tube-member. The tumbler 77 is fixed to the tube-member after the tumblers are put in place, as by means of a screw 80, the inner end of which is set into the threaded portion of the tube-member to prevent relative turning between the tumbler 77 and the tube-member. The outer end of the screw, after insertion of the screw is removed so as to form a surface similar to the surface of the tumbler 77, to obscure the screw.

The peripheries of the tumblers are provided with digits 81, preferably from naught to nine. The tumblers 74, 75 and 76 are provided with inner annular flanges 82, the inner walls of which have bearing upon the outer periphery of the tube-member, between the shoulder 73 and the tumbler 77, so as to rotate the same with relation to each other and the tumbler 77. Each of the internal flanges is provided with a slot 83. The teeth 61 on the stem are sufficiently long to project through the slot 60 in the tube-member and across the inner flanges of the tumblers 74, 75 and 76, when said flanges are located in radial position with relation to the slot 60, but when the slots 83 in said flanges are in line with said teeth, the teeth may pass through said slots. The slot 60 in the tube-member preferably extends to the pivot-end of the tube-member, and the bore preferably also extends to the pivot-end of the tube-member, so that the stem-member may be moved inwardly in the tube-member, in order that its teeth may have complete movement in said slots for ready complete release of the release-lever and of the pawl of the latching mechanism, when the parts are in released position.

Spaces 84 are located in rear of the teeth 61. When the release-lever is in locked relation, the inner flanges of the respective tumblers 74, 75 and 76 are received in these spaces. In order to afford release of the release lever, it is necessary to so manipulate all the rotating tumblers as to place the slots 83 in the inner flanges 82 thereof in line with all of the teeth 61 before any release movement of the release-lever can be had.

In order to hold the tumblers 74, 75 and 76 in assumed positions I have provided the same with rabbets 85, in which springs 86, shown as spiral springs, are received. These springs exert pressure between adjacent tumblers 74, 75, 76, and between these tumblers and the shoulders 73 and the tumbler 77.

The slot 60 in the tube-member preferably terminates at its forward end at the threaded portion of the tube-member, for forming a shoulder 87 against which the end tooth 61 is arranged to impinge for limiting separating movement between the release-lever and the handle of the brake-lever.

In assembling the parts, the stem-member is arranged to be received through the rear or pivot end of the tube-member, the pivot end of the stem passing through the tube-member and projecting through the swinging end thereof. The tumblers and springs having been placed in position, the ends of these members are pivotally connected with the brake-lever and the release-lever.

My improved device provides a simple construction so arranged and positioned that ready manipulation of the tumblers may be had, when desired, the digits on the tumblers being in convenient position for being readily viewed by the operator, so that one who is familiar with the combination of the lock may readily manipulate the tumblers for readily placing the same in release relation, but affording a secure lock against manipulation by one who is not familiar with the combination. It also provides a ready locking means all parts of which remain in place between the levers.

Having thus fully described my invention, what I claim as new and desire to secure by Letters Patent, is:

1. In a locking mechanism of the character described, the combination of a pair of elements in the form of a brake-lever and a release-lever, a tube-member and a stem-member pivoted to said respective elements and extending toward each other between said elements, said stem-member movable axially in said tube-member, said stem-member provided with locking parts, and said tube-member provided with a slot in which said locking parts move, and rotatable members between said elements about said tube-member and said stem-member, said rotatable members provided with locking portions coacting with said first-named locking parts.

2. In a locking mechanism of the character described, the combination of a brake-lever, a release-lever pivoted thereto, a tube-member having pivotal connection with said brake-lever, a stem-member provided with teeth and having pivotal connection with said release-lever, said stem-member extending axially into said tube-member and having axial movement therein, said tube-member and said stem-member located between said brake-lever and said release-lever, said tube-member and said stem-member provided with coacting shoulders to limit separation between said levers, and tumblers surrounding said tube-member arranged to coact with said teeth to limit releasing approach between said levers.

3. In a locking mechanism of the character described, the combination of a brake-lever provided with a handle, a release-lever having pivotal connection with said brake-lever, said handle comprising a body fixed to said brake-lever and a cap, a tube-member provided with a pivot-ball and said body and cap of said handle provided with a ball-recess in which said pivot-ball is received, means for securing said cap and body together for fixing said ball in said handle, said tube-member provided with an axial bore and with a peripheral slot communicating with said bore and extending lengthwise of said tube-member, said slot terminating in advance of the swinging end of said tube-member for forming a shoulder, a stem-member having pivotal connection with said release-lever, said stem-member provided with teeth, said stem-member received in and slidable axially in said bore and said teeth slidable lengthwise in said slot and projecting beyond the outer periphery of said tube-member, and tumblers surrounding said tube-member and provided with inner flanges having notches therein, said inner flanges and notches arranged to coact with said teeth, and said tube-member and said stem-member located in axial alinement between said handle and said release-lever above said pivotal connection between said levers.

In testimony whereof I have hereunto signed my name in the presence of two subscribing witnesses.

JOSEPH ROSZMANN.

In presence of—
    JAMES J. FITZPATRICK,
    DELMA WERNSING.